March 2, 1943.  H. R. REYNOLDS  2,312,590
ADAPTER
Filed March 5, 1941
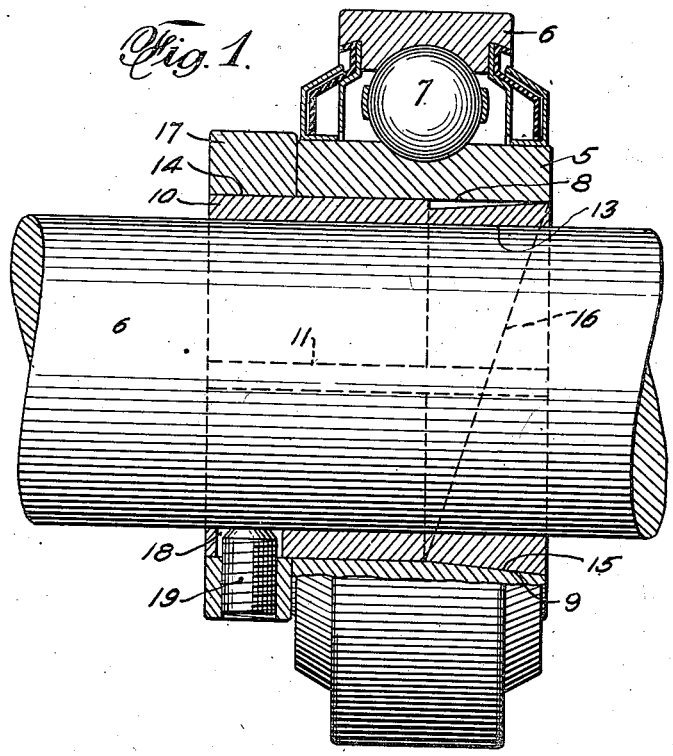
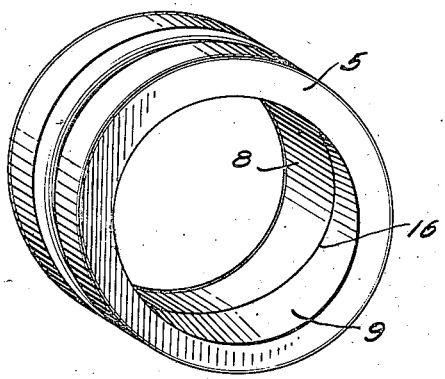
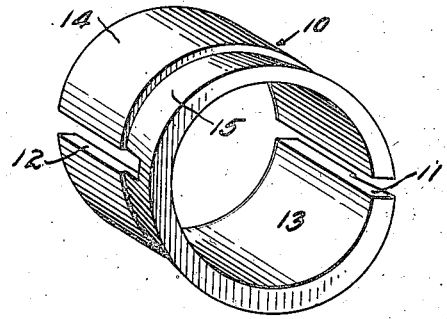
INVENTOR
HARRY R. REYNOLDS
BY
ATTORNEYS.

Patented Mar. 2, 1943

2,312,590

UNITED STATES PATENT OFFICE 2,312,590

ADAPTER

Harry R. Reynolds, New Britain, Conn., assignor to The Fafnir Bearing Company, New Britain, Conn., a corporation of Connecticut Application March 5, 1941, Serial No. 381,785

6 Claims. (Cl. 287—52.09)

My invention relates to a self-locking adapter particularly, though not exclusively, for anti-friction bearings.

Adapters for anti-friction bearings have heretofore been employed and usually comprise a split sleeve having a conical outer surface to fit within a conically formed bore in the inner ring. The adapter sleeve is usually threaded and provided with a nut to draw the conical sleeve into the conical bore of the inner ring, so as to clamp the sleeve tightly on the shaft and tightly in the conical bore of the inner ring. With such conventional adapters if, for any reason, the ring is not properly set up on the adapter sleeve or, after being set up, should accidentally work loose, the looseness is usually aggravated during further operation, with the possibility of consequent damage to the bearing or to parts of the machine. Furthermore, conical bores, if extending from end to end of an inner bearing ring, require removal of metal from directly beneath the raceway groove, thus weakening the inner ring.

It is an object of my invention to provide an improved form of self-locking adapted means for a ring, such as the inner ring of an anti-friction bearing.

It is another object to provide adapter means for a ring which will be self-locking.

Another object is to provide adapter means which will provide a proper tightness of fit and in which the fit is not dependent upon the judgment of the mechanic making the installation.

Another object is to provide a simple, relatively inexpensive form of adapter means.

Other objects and various features of novelty and invention will be hereinafter pointed out or will become apparent to those skilled in the art.

In the drawing which shows, for illustrative purposes only, a preferred form of the invention—

Fig. 1 is a vertical axial sectional view through a bearing and adapter illustrative of the invention, parts being shown in elevation;

Fig. 2 is an isometric view of the inner ring of the bearing shown in Fig. 1; and Fig. 3 is a similar view of an adapter sleeve.

In the illustrative form herein disclosed the ring 5 to be secured to a shaft, such as 6, may be the inner ring of an anti-friction bearing, which would include an outer ring 6 and interposed anti-friction bearing members, such as balls 7, running in the usual raceway grooves. The ring 5 has a bore which, in the preferred form, is for the most part cylindrical, as shown at 8, and concentric with the ball race. The bore of the ring, however, has an eccentrically formed portion at one end and I prefer to make the eccentrically formed portion substantially cylindrical in form, as indicated at 9. Such eccentrically formed portion 9 is preferably tapering relatively to the cylindrical portion 8 of the bore, and the two bore portions 8—9 may be said to be cylindrical but formed about axes at a slight angle to each other. The eccentric portion 9 need not be formed as last stated but it may be conveniently so formed by a grinding wheel set on an axis at a small angle to the axis of the chucked ring.

The adapter sleeve 10 is preferably split, for example, by a through slot 11 at one side and a long slot or notch 12 at the opposite side. The sleeve has a cylindrical bore 13 to substantially fit the shaft 6 and be received thereon, and preferably has a cylindrical outer surface 14 concentric of the bore and adapted to fit the cylindrical portion 8 of the ring 5. At one end the sleeve has an outer surface formed eccentrically to the bore, as indicated at 15, which surface is adapted to more or less fit the corresponding tapered eccentric surface 9 of the ring 5. For ease of manufacture the eccentrically formed surface 15 on the sleeve may be in the form of a conical surface. Whereas the low side of the eccentric surface 15 performs no substantial function, since it does not, in this embodiment, actually coact with any portion of the bore of the inner ring, the surface 15 may nevertheless be so formed because of the ease of turning such a surface on the sleeve.

It will be seen that only the high part of the eccentric surface 15 engages the eccentric surface 9 of the ring and it will be observed that that eccentric surface 9 in effect runs out along the angular line 16.

The adapter sleeve is secured to the shaft in any suitable manner and, in the form shown, I employ a collar 17 extending about the projecting end of the sleeve 14. The sleeve may be provided with a hole 18 therein and the collar may have a set screw 19 threaded therein and extending transversely thereof and through the opening or hole 18 and into engagement with the shaft, so as to clamp the sleeve securely to the shaft.

It will be seen that the parts of my improved adapter sleeve and ring are all of very simple construction and may be readily and cheaply manufactured.

The parts may be very readily assembled. The adapter sleeve with the ring in place may be slipped along the shaft to the desired position. The set screw may then be turned up so as to clamp the sleeve to the shaft, and clearly the collar will hold the ring in assembled relation with the sleeve. A slight turning of the ring on the sleeve will serve to cause the eccentric portions of the sleeve and ring to ride up on each other and thus securely anchor the sleeve to the shaft and the ring to the sleeve. The bearing and sleeve will be self-locking and if for any reason, for example due to a reverse rotation of the shaft, the ring should loosen on the sleeve, it will immediately relock itself by reason of the eccentric surfaces running up on each other. It will be observed that my improved adapter bearing tends to hold the ring properly seated on the sleeve and concentric with the shaft. The eccentric portions being preferably to one side of the raceways (in a ball bearing) prevent weakening of the inner ring, and yet the ring is very securely locked on the shaft.

While the invention has been described in considerable detail and a preferred form illustrated, it is to be understood that various changes may be made within the scope of the invention as defined in the appended claims.

I claim:

1. In a self-locking adapter for a bearing ring, a bearing ring having a cylindrical bore and an eccentrically formed tapered bore merging with said cylindrical portion, an adapter having a cylindrical outer surface to fit said cylindrical bore and having an eccentrically formed tapering outer surface to fit the corresponding bore in said bearing ring, said adapter having a cylindrical bore to fit a shaft, and means for holding said adapter against endwise disengagement from said bearing ring, for the purpose described.

2. In a self-locking adapter for a ring, said ring having a cylindrical bore and a tapering eccentrically formed portion in said bore, said tapering portion being formed about an axis at an angle to the axis of the cylindrical portion of said bore, an adapter sleeve having a cylindrical bore, and a cylindrical concentric outer surface to fit the cylindrical bore of said ring, said sleeve having an eccentrically formed portion to extend within the eccentrically formed bore portion of said ring.

3. In a self-locking adapter, a ring having a bore defined by two generally cylindrical surfaces formed about axes at a slight angle to each other, whereby a part of one cylindrical bore is eccentric to a part of the other cylindrical bore, an adapter having a cylindrical bore to fit a shaft and a cylindrical outer surface to fit one of the cylindrical bores of said ring, said adapter having an outer eccentric surface to fit the eccentric part of the bore of said ring.

4. In a self-locking adapter, a ring having a cylindrical bore, the bore of said ring at one end having a tapering eccentrically formed portion therein, an adapter including a sleeve having a cylindrical bore to fit a shaft and having a concentric cylindrical surface to fit the corresponding cylindrical surface of said ring, said sleeve having an eccentrically formed outer surface to fit the eccentrically formed bore surface of said ring, and means for securing said sleeve to a shaft in the bore of said sleeve.

5. In a self-locking adapter, a ring having a cylindrical bore, said bore at one end of said ring being formed eccentrically of the remainder of said bore, a split adapter sleeve having a cylindrical bore to fit a shaft, said sleeve having a cylindrical outer surface to fit the cylindrical portion of the bore of said ring, said sleeve having an eccentrically formed portion to fit the eccentrically formed portion of the bore of said ring, said sleeve having a radial hole therethrough at the end opposite said eccentrically formed portion, a collar surrounding said ring, and a set screw threaded into said collar and extending through said hole in said sleeve and into engagement with a shaft passing through said sleeve, for the purpose described.

6. In a self-locking adapter for a bearing ring, a bearing ring having a cylindrical bore and an eccentrically formed bore at one end of said cylindrical bore, an adapter including a sleeve having a cylindrical bore to fit a shaft and having a concentric cylindrical surface to fit within the cylindrical bore of said bearing ring, said sleeve at one end having an outer surface formed eccentrically to the bore and outer cylindrical surfaces thereof and fitting within the eccentrically formed bore in said bearing ring, and means for holding said adapter against endwise disengagement from said bearing ring, for the purpose described.

HARRY R. REYNOLDS.